March 7, 1961 H. G. SHAKESPEARE 2,973,916
FISHING REEL CONSTRUCTION
Filed Dec. 2, 1957
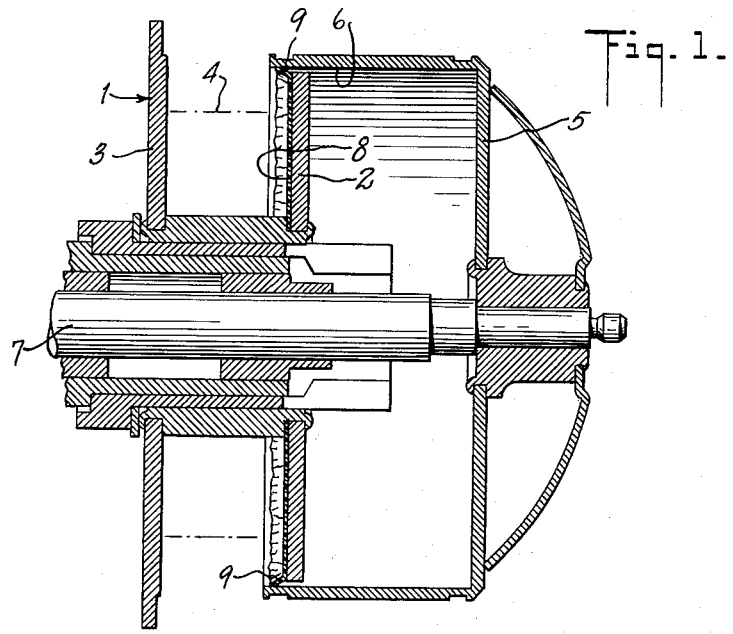
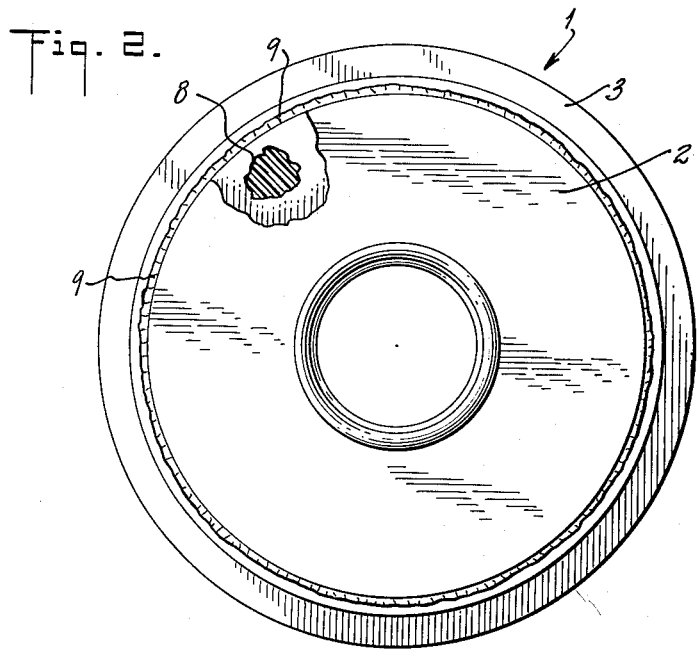
INVENTOR.
HENRY G. SHAKESPEARE
BY
Kenyon & Kenyon
ATTORNEYS

United States Patent Office 2,973,916
Patented Mar. 7, 1961

2,973,916

FISHING REEL CONSTRUCTION

Henry G. Shakespeare, Kalamazoo, Mich., assignor to Shakespeare Company, Kalamazoo, Mich., a corporation of Michigan Filed Dec. 2, 1957, Ser. No. 700,114

2 Claims. (Cl. 242—842)

This invention relates to fishing reels, generally known as spinning reels, and particularly to the type in which there is mounted axially with the spool and surrounding the same a pickup member.

In such reels where the pickup member fits over the spool there is a tendency for the line to go through between the front flange of the spool and the pickup member, causing difficulty in operation.

An object of this invention is to provide a spinning reel in which the aforesaid difficulty is eliminated.

Another object is to provide such a reel in which a suitable flexible member is employed which extends from the front flange of the spool to and in contact with the inner face of the pickup member, thus keeping the line from passing through between the flange and the pickup member.

Another object is to provide such a reel with the flexible member in which friction is reduced to a minimum and in which the water picked up and brought in by the line will not interfere with the operation of the reel.

Other objects and advantages of the invention will be apparent from the following description in which a preferred form of the reel is shown, and in which—

Fig. 1 is a cross-sectional view showing the spool and pickup member of a fishing reel with the invention incorporated therein; and Fig. 2 is a view from the front showing the spool.

Fishing reels embodying the invention have a spool with a circular front flange and a line spooling member is mounted for rotation in front of said spool and on the axis thereof. The spooling member has a cylindrical recess therein which is of a diameter greater than that of the forward flange of the spool and which is fitted loosely and concentrically over said front flange. A disk of waterproof flexible sheet material is disposed against the front flange of the reel, preferably the rear face thereof, and is held in position with the line wound on the spool. The disk is of a diameter greater than that of the cylindrical opening in the spooling member, and when the spooling member is disposed about the front flange of the spool the periphery of the disk extends out radially of the spool and into contact with the inner wall of the cylindrical recess in the spooling member. The periphery of the disk is folded backwardly and crimped so that it presents a minimum frictional contact with the wall of the spooling member. The disk is of waterproof flexible sheet material having a low coefficient of friction and is preferably of tetrafluoroethylene, which is a material sold under the trademark Teflor. This material has excellent stability to heat, will withstand the attack of most corrosive materials, and against steel has a low coefficient of friction, namely, about 0.04. It is employed in a plastic or flexible form. Other plastic materials having similar characteristics, in part at least, could be employed with advantage.

Referring to Fig. 1, the spool 1, which is essentially a fixed spool, has a front flange 2 and a rear flange 3 which may be of greater diameter than the front flange. The line 4 is wound between the flanges.

The spooling member 5, which is provided with the usual retractable pickup member which is not shown in detail since it has no part of the present invention, has a cylindrical opening 6 at its rear. The spooling member 5 is mounted coaxially with the spool for rotation about the axis of the spool on a suitable driving shaft 7. The cylindrical recess 6 is of greater diameter than the front flange 2 of the spool and fits loosely and concentrically over said front flange.

A disk 8 of waterproof flexible sheet plastic is disposed at and against the rear face of the front flange 2. It is a circular disk having a diameter greater than the inner diameter of the recess 6 of the spooling member and its peripheral edge 9 extends out into contact with the inner wall of the cylindrical recess 6. The peripheral inner edge is bent rearwardly, as shown in Fig. 1, and is crimped, as shown in Fig. 2. This crimping of the edge greatly reduces the area of the disk which would contact the inner wall of the recess 6, this providing minimum frictional contact between the disk and the spooling member. However, the flexible disk does effectively fill the space between the front flange 2 of the spool and the spooling member, preventing the line from passing through the space between these members.

The flexible waterproof disk 8 is preferably made of tetrafluoroethylene or a polymer thereof. The sheet may be of about $5/1000$ of an inch in thickness, which gives sufficient stiffness with adequate flexibility to give the desired contact between the periphery of the disk and spooling member without undue friction. It will be apparent that the thickness of the sheet from which the disk is made can be varied from this particular thickness, provided that these factors are kept in mind.

The material has against steel a coefficient of friction about 0.04 and is sufficiently waterproof so that it does not swell from wetting when the reel is in use.

A preferred form of the invention has been described, but it will be apparent that variations thereof may be employed and that by describing the preferred form of the invention there is no intention of limiting the invention to the specific form.

I claim:

1. In a fishing reel, a spool having an axis and a circular front flange perpendicular thereto having a rear face, a line spooling member mounted for rotation in front of said spool and about the axis thereof and having a cylindrical recess of a diameter greater than said front flange and having a wall fitted loosely and concentrically over said front flange and a disk of waterproof flexible sheet tetrafluoroethylene of a diameter greater than that of said cylindrical recess and having a central body portion disposed against the rear face of said flange and having a portion adjacent the wall of said reces crimped to form a wavy outer peripheral edge comprising a plurality of bends and extending rearwardly at a substantial angle to said body portion to provide a portion offset from the plane of said body portion and having the outermost portion only of each bend of its crimped periphery in contact with the wall of said recess to present a minimum of frictional surface to said wall.

2. In a fishing reel, a spool having an axis and a circular front flange perpendicular thereto, a line spooling member mounted for rotation in front of said spool and about the axis thereof and having a cylindrical recess of a diameter greater than said front flange and having a wall fitted loosely and concentrically over said front flange and a disk of waterproof flexible sheet material having a low coefficient of friction of a diameter greater than that of said cylindrical recess and having a central body portion disposed against said flange and having a portion adjacent the wall of said recess crimped to form a wavy outer peripheral edge comprising a plurality of bends and extending rearwardly at a substantial angle to said body portion to provide a portion offset from the plane of said body portion and having the outermost portion only of each bend of its crimped periphery in contact with the wall of said recess to present a minimum of frictional surface to said wall.

References Cited in the file of this patent

UNITED STATES PATENTS

| | | |
|---|---|---|
| 2,494,598 | Waring | Jan. 17, 1950 |
| 2,675,192 | Hull | Apr. 13, 1954 |
| 2,687,855 | Shakespeare et al. | Aug. 31, 1954 |
| 2,776,803 | Shakespeare et al. | Jan. 8, 1957 |
| 2,884,211 | Holahan, Jr. | Apr. 28, 1959 |

FOREIGN PATENTS

| | | |
|---|---|---|
| 262,494 | Switzerland | Oct. 17, 1949 |

OTHER REFERENCES

Publication, "Product Engineering," Teflon Components and Coatings, pages 149–153 relied on.